US012587062B2

(12) United States Patent
Schreiber et al.

(10) Patent No.: US 12,587,062 B2
(45) Date of Patent: Mar. 24, 2026

(54) ELECTRIC MOTOR POSITIONING APPARATUS INCLUDING RUBBER POT

(71) Applicant: Hilti Aktiengesellschaft, Schaan (LI)

(72) Inventors: Wolfgang Schreiber, Buchloe (DE);
Helmut Burger, Unterdießen (DE);
Konrad Artmann, Schondorf (DE);
Tobias Schmid, Emmenhausen (DE);
Manfred Ege, Steingaden (DE)

(73) Assignee: Hilti Aktiengesellschaft, Schaan (LI)

( * ) Notice: Subject to any disclaimer, the term of this patent is extended or adjusted under 35 U.S.C. 154(b) by 453 days.

(21) Appl. No.: 17/919,377

(22) PCT Filed: May 3, 2021

(86) PCT No.: PCT/EP2021/061533
§ 371 (c)(1),
(2) Date: Oct. 17, 2022

(87) PCT Pub. No.: WO2021/228600
PCT Pub. Date: Nov. 18, 2021

(65) Prior Publication Data
US 2023/0198336 A1 Jun. 22, 2023

(30) Foreign Application Priority Data
May 13, 2020 (EP) .................................... 20174382

(51) Int. Cl.
*H02K 7/08* (2006.01)
*F16C 19/06* (2006.01)
*H02K 11/215* (2016.01)

(52) U.S. Cl.
CPC ............. *H02K 7/085* (2013.01); *F16C 19/06* (2013.01); *H02K 11/215* (2016.01); *F16C 2380/26* (2013.01); *H02K 2211/03* (2013.01)

(58) Field of Classification Search
CPC .. H02K 5/02; H02K 5/04; H02K 5/15; H02K 5/16; H02K 5/163; H02K 5/165;
(Continued)

(56) References Cited

U.S. PATENT DOCUMENTS

2001/0045784 A1* 11/2001 Niimi ...................... H02K 5/10
310/90
2007/0296294 A1 12/2007 Nobe et al.

FOREIGN PATENT DOCUMENTS

CN 101093952 A 12/2007
DE 19949755 A1 4/2001
(Continued)

OTHER PUBLICATIONS

17919377_2024-11-05_DE_102018205099_A1_H.pdf (Year: 2024).*
(Continued)

*Primary Examiner* — Christopher M Koehler
*Assistant Examiner* — Ahmed F Seck
(74) *Attorney, Agent, or Firm* — Davidson Kappel LLC

(57) ABSTRACT

Positioning apparatus for an electric motor and bearing block, wherein the electric motor includes a rotor, a rotor shaft and a stator. The positioning apparatus is configured at least partially from an elastic material and in a substantially pot-like manner with an interior and can be positioned in a central recess of the bearing block for at least partially receiving a first end of the rotor shaft.

21 Claims, 14 Drawing Sheets

(58) Field of Classification Search
CPC ...... H02K 5/167; H02K 5/1675; H02K 5/173;
H02K 5/24; H02K 7/08; H02K 7/085;
H02K 7/09; H02K 7/086; H02K 7/088;
H02K 7/14; H02K 7/145; H02K 11/012;
H02K 11/0141; H02K 11/21; H02K
11/215; H02K 2211/03; H02K 2213/09;
H02K 5/1732; H02K 5/10; F16C 19/02;
F16C 19/04; F16C 19/06; F16C 19/12;
F16C 19/225; F16C 2380/26
USPC ........................................................ 310/90
See application file for complete search history.

(56) References Cited

FOREIGN PATENT DOCUMENTS

| DE | 102006035387 A1 | | 5/2008 | | |
|----|----|----|----|----|----|
| DE | 102018205099 A1 | * | 11/2018 | ............. | B23K 26/18 |
| EP | 2160819 B1 | * | 9/2015 | ............. | H02K 11/00 |
| FR | 2918221 A1 | | 1/2009 | | |
| JP | 3097749 U | | 2/2004 | | |
| WO | WO2005029687 | | 3/2005 | | |
| WO | WO2019053669 A2 | | 3/2019 | | |

OTHER PUBLICATIONS

17919377_2024-11-05_EP_2160819_B1_H.pdf (Year: 2024).*
EP2160819B1—Translation (Year: 2024).*
International Search Report of PCT/EP2021/061533 dated Aug. 3, 2021.

* cited by examiner

ELECTRIC MOTOR POSITIONING APPARATUS INCLUDING RUBBER POT

The present invention relates to a positioning apparatus for an electric motor and bearing block, wherein the electric motor includes a rotor, a rotor shaft and a stator.

In addition, the present invention relates to an electric motor including a rotor, a rotor shaft and a stator, wherein the electric motor can be connected to a bearing block.

BACKGROUND

Modern machine tools, such as hammer drills, saws, grinders or the like, include an electric motor as a drive and for generating a torque.

SUMMARY OF THE INVENTION

Electric motors are relatively complex apparatuses in which numerous components are installed in a manner positioned with predetermined orientations in relation to one another.

In particular, the orientation and positioning of the rotor shaft in relation to the bearing block often proves to be problematic here since the installation space in an electric motor has to be limited here and close tolerances have to be adhered to.

In addition, the construction of the electric motor should be kept as simple as possible in order to keep the costs and the assembly effort for the electric motor low.

It is an object of the present invention to provide a positioning apparatus for an electric motor and bearing block and also an electric motor with which the above-mentioned problem can be solved.

The present invention provides a positioning apparatus for an electric motor and bearing block, wherein the electric motor includes a rotor, a rotor shaft and a stator.

According to the invention, the positioning apparatus is configured at least partially from an elastic material and in a substantially pot-like manner with an interior and can be positioned in a central recess of the bearing block for at least partially receiving a first end of the rotor shaft. As a result, the most precise possible orientation and positioning of the rotor shaft in relation to the bearing block can be achieved in a simple manner.

According to an advantageous embodiment of the present invention, it may be possible that at least one fixing device is included for receiving and holding a bearing for the first end of the rotor shaft. As a result, the orientation and positioning of the rotor shaft in relation to the bearing block can be further improved. The fixing device can respectively include a clamping surface on a lateral inner surface and/or a stop element in the axial direction.

According to a further advantageous embodiment of the present invention, it may be possible that at least one holding device is included for receiving and holding a Hall board. As a result, the Hall board can be releasably connected to the apparatus with precise positioning and predetermined orientation of the Hall board in relation to the rotor can be achieved. The holding device can respectively include a first and/or second raised portion in the axial direction, wherein the first and the second raised portion can have different axial lengths.

According to a further advantageous embodiment of the present invention, it may be possible that an axially running clearance is included on an outer lateral surface for at least partially receiving and holding a line when the positioning apparatus is in the central recess of the bearing block. The effect that can be achieved as a result is that the line is routed at a predetermined point and is not unintentionally trapped between components.

According to a further advantageous embodiment of the present invention, it may be possible that a dust protection cap is included at a first end of the positioning apparatus. As a result, ingress of dust or other contaminants into the interior of the electric motor can be prevented in a simple manner.

In addition, the present invention provides an electric motor including a rotor, a rotor shaft and a stator, wherein the electric motor can be connected to a bearing block.

According to the invention, it is provided that a positioning apparatus is included, which is configured at least partially from an elastic material and in a substantially pot-like manner with an interior and can be positioned in a central recess of the bearing block for at least partially receiving a first end of the rotor shaft.

BRIEF DESCRIPTION OF THE DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and put them together to form useful further combinations.

In the figures.

DETAILED DESCRIPTION

Figure 1:
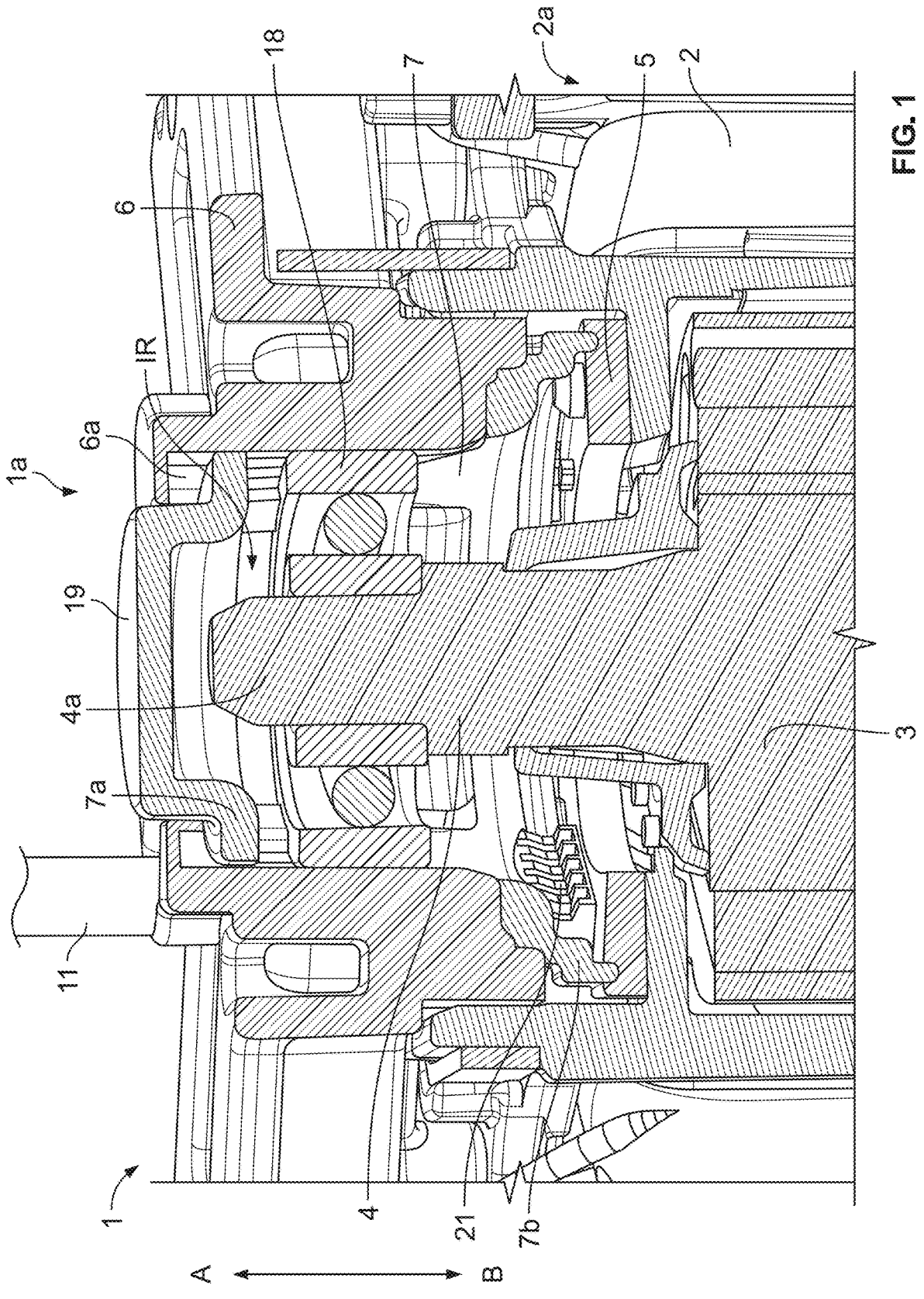
FIG. 1 shows a cross section through an electric motor comprising a stator, a rotor, a rotor shaft, a bearing block and a positioning apparatus.

FIG. 1 shows a first end 1 a of an electric motor 1. Here, the electric motor 1 substantially includes a stator 2, a rotor 3, a rotor shaft 4, a Hall board 5, a bearing block 6 and a positioning apparatus 7.

The electric motor 1 can be used as a drive for a machine tool and serves substantially to generate a torque. The torque generated can be transmitted either directly to a tool that is connected to a machine tool or to the tool with the aid of a gear mechanism. Neither the machine tool nor the tool are shown in the figures.

The rotor 3 is connected to the rotor shaft 4 in a rotationally fixed manner and is located in an interior of the stator 2 such that a first end 4a of the rotor shaft 4 protrudes out of the stator 2 in direction A. The direction A is the axial direction of the electric motor 1. A second end of the rotor shaft 4 is not shown in the figures. The rotor shaft 4 is designed substantially as a cylindrical rod and serves to transmit a torque generated in the electric motor 1 to a gear mechanism.

The bearing block 6 is configured in a substantially pot-like manner and has a central, circular clearance 6a. The bearing block 6 serves to receive and hold the stator 2 and rotor 3. The bearing block 6 can in turn be connected to a housing of a machine tool.

As also shown in FIG. 1, the stator 2, by way of a first end 2a, is connected to the bearing block 6 such that the first end 4a of the rotor shaft 4 protrudes into the central recess 6a of the bearing block 6.

Figure 2:
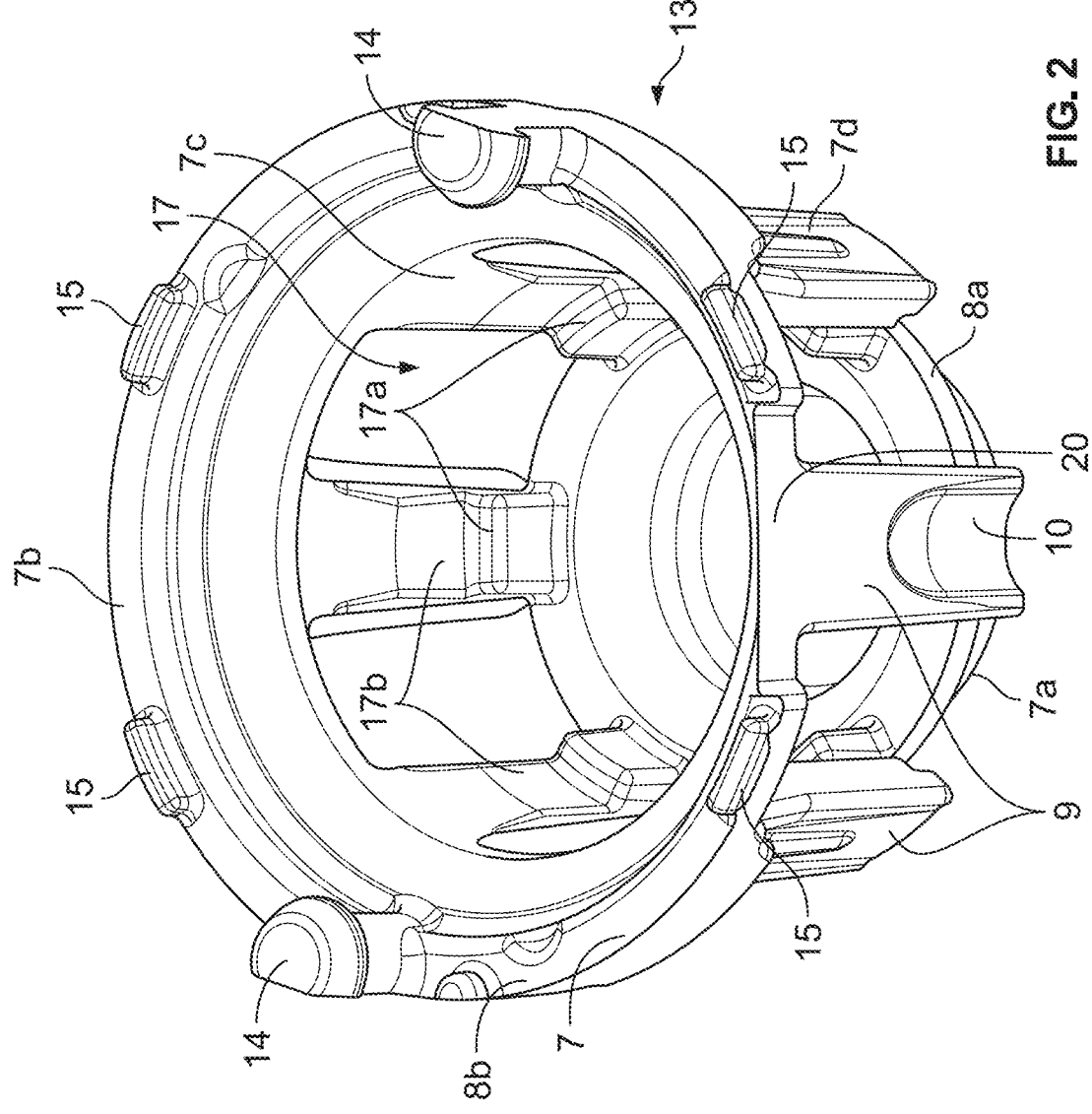
FIG. 2 shows a perspective view of the positioning apparatus with a bottom side and an interior.
Figure 3:
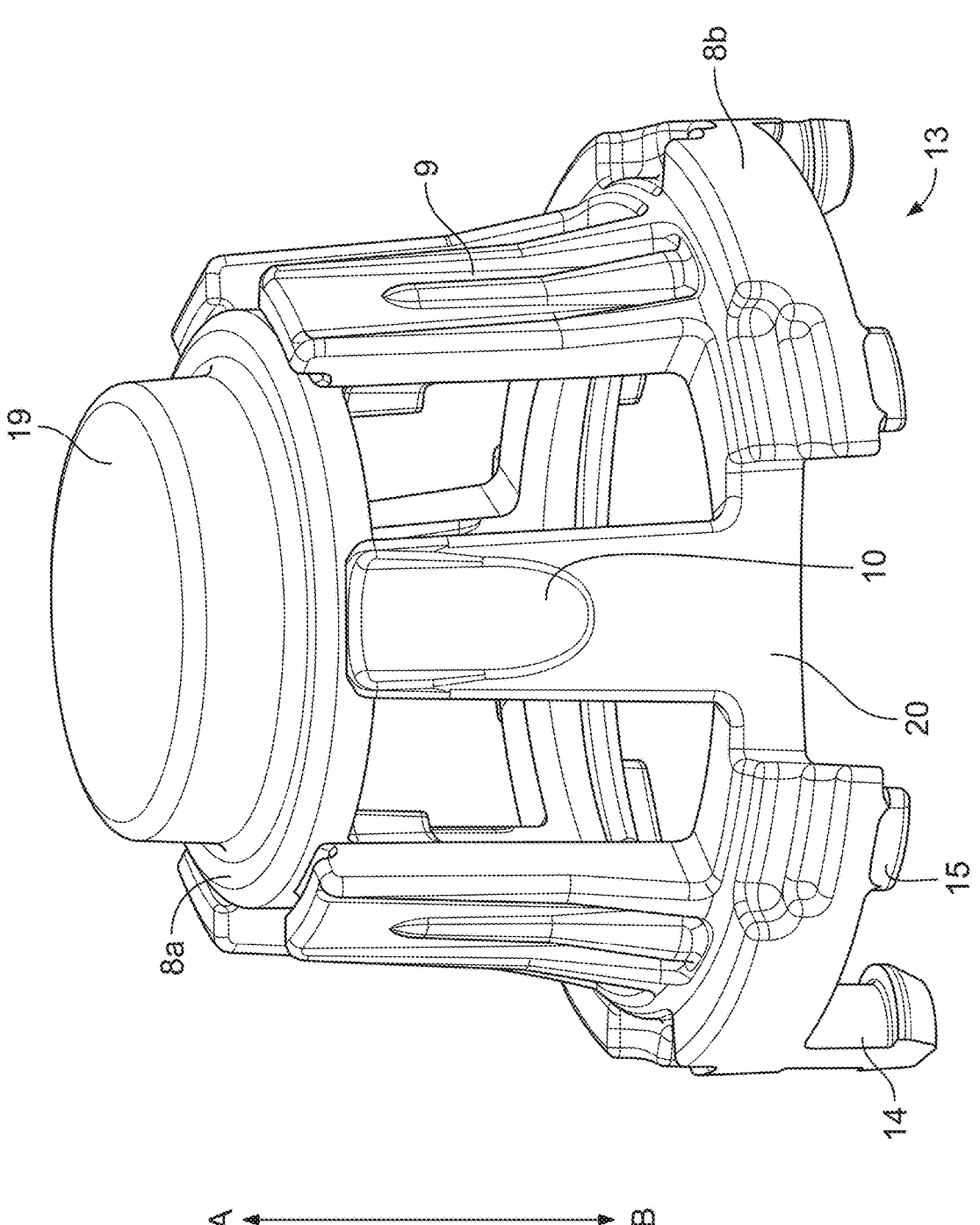
FIG. 3 shows a perspective view of the positioning apparatus, which view shows a top side and a dust protection cap of the positioning apparatus.

As shown in FIGS. 2 and 3 in particular, the positioning apparatus 7 is configured in a substantially pot-like manner. The embodiment of the pot-like positioning apparatus 7 shown in the figures includes a first end 7a, a second end 7b, an inner lateral surface 7c, an outer lateral surface 7d, an upper ring element 8a, a lower ring element 8b and six support elements 9.

The positioning apparatus 7 is manufactured from an elastic material. The elastic material may be rubber, for example.

The positioning apparatus 7 can also be referred to as a rubber pot.

The six support elements 9 are arranged at regular intervals in a circle and connect the lower ring element 8b to the upper ring element 8a. The upper ring element 8a is provided at the first end 7a and the lower ring element 8b is provided at the second end 7b of the positioning apparatus 7. The lower ring element 8b has a larger diameter than the upper ring element 8a. The positioning apparatus 7 is therefore shaped in a conical manner or as a truncated cone.

According to an alternative embodiment, more or fewer than six support elements 9 can be included. It is also possible that, instead of the individual support elements 9, a continuous lateral surface is included. Each support element 9 includes an upper end 9a and a lower end 9b. The upper end 9a of each support element 9 is firmly connected to the upper ring element 8a and the lower end 9b of each support element 9 is in turn firmly connected to the lower ring element 8b. The support elements 9 extend in direction A. A respective opening is provided between the individual support elements 9. Five of the six support elements 9 are configured in an almost identical manner. As will be described in detail later, one of the six support elements 9 includes, on the outer lateral surface, an axially running clearance 10 for receiving and holding a line 11 (see, e.g., FIGS. 3 and 4). The axially running recess 10 can also be referred to as an indentation or notch. The line 11 can in turn also be referred to as a stranded wire and connects the Hall board 5 to a control device of the electric motor 1 or the machine tool. The Hall board 5 contains three Hall sensors 12 on a bottom side 5a, see FIG. 4. The Hall sensors 12 serve to sense the position of the rotor 3 relative to the stator 2. The position data sensed by the Hall sensors 12 can be sent from the Hall board 5 to the control device by means of the line 11.

As can be seen in FIG. 2, the lower ring element 7b includes a holding device 13 for receiving and holding the Hall board 5. The Hall board 5 is a board (also called a printed circuit board) with the plurality of Hall sensors 12. The holding device 13 shown in the present exemplary embodiment includes two high fixing elements 14 and four low orientation elements 15. The fixing element 14 and the orientation elements 15 are respectively positioned opposite one another. Here, the low orientation elements 15 are less than half as high as high raised portions 14. Each of the raised portion extends in direction A.

Figure 4:
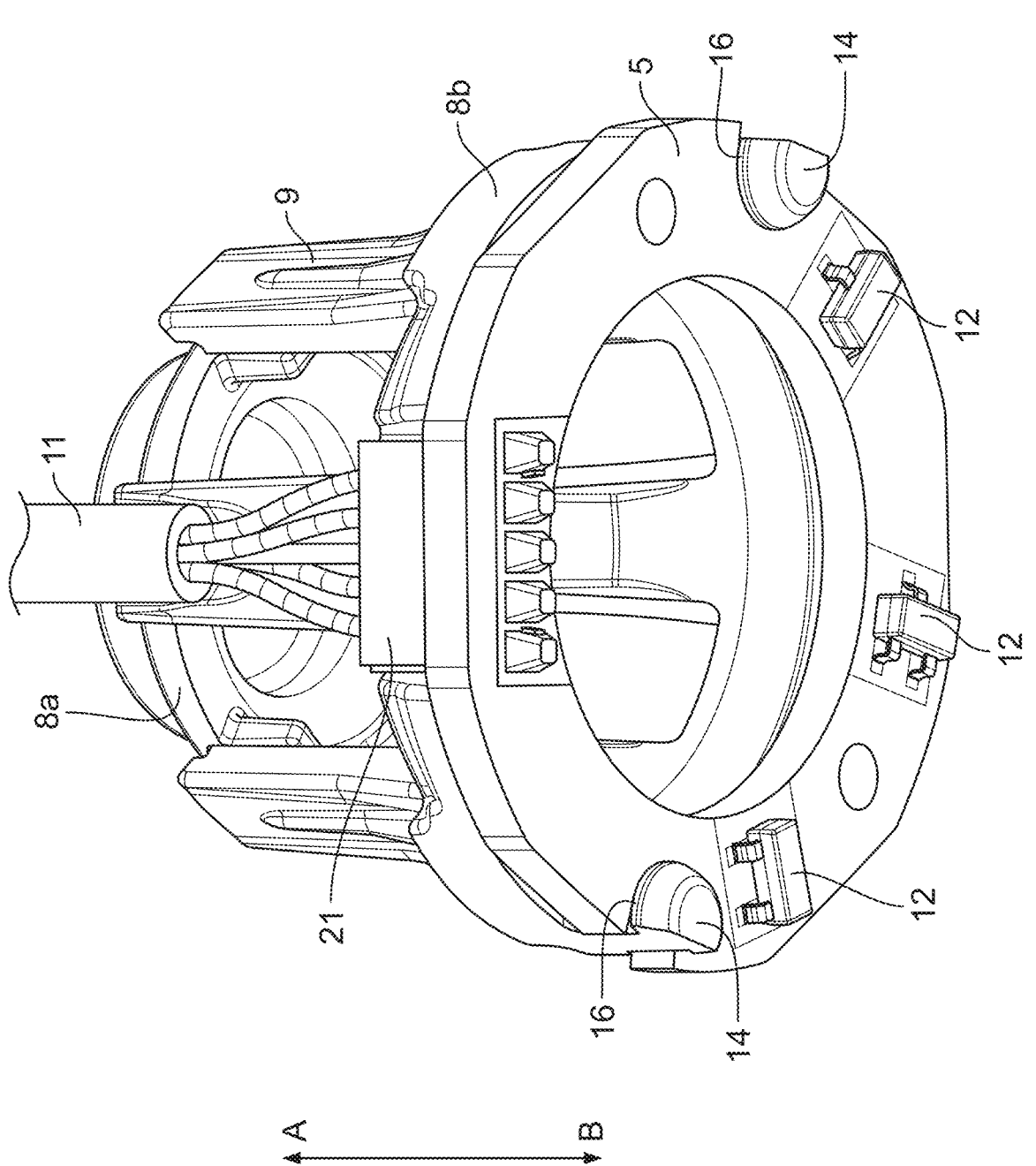
FIG. 4 shows a perspective view of the bottom side of the positioning apparatus with a Hall board.
Figure 5:
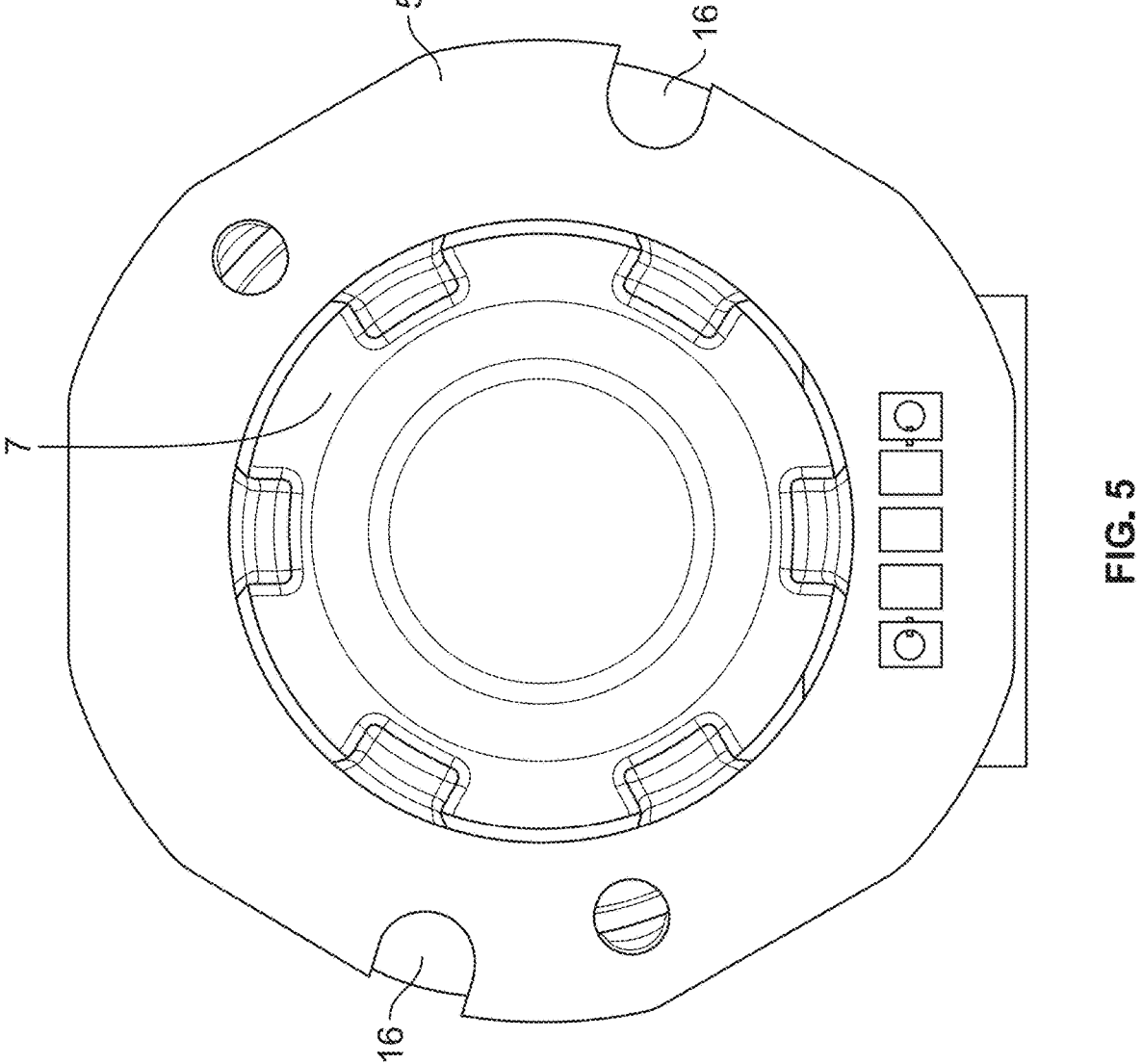
FIG. 5 shows a view of the positioning apparatus with the Hall board from below.
Figure 10:
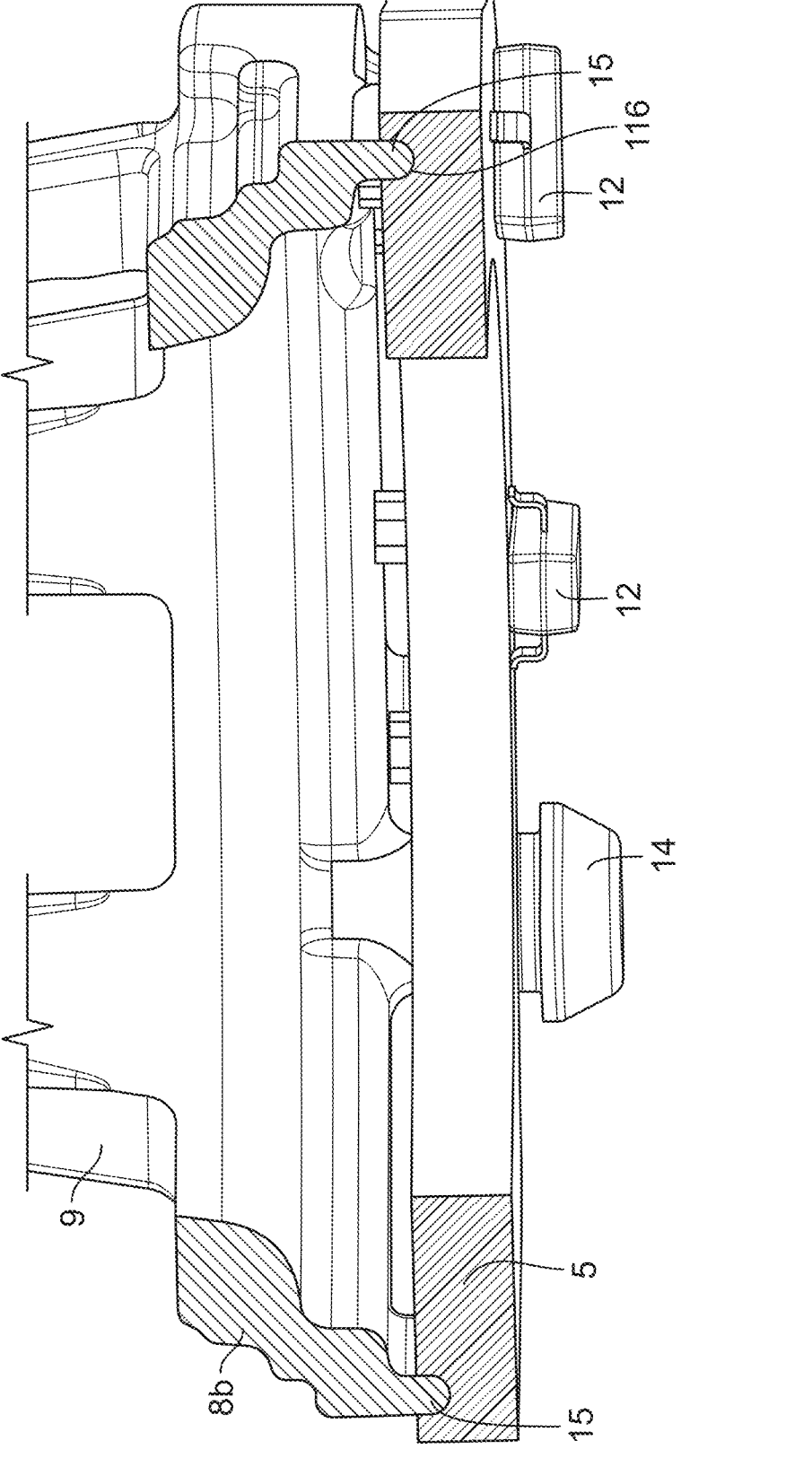
FIG. 10 shows a sectional view of a lower end of the the positioning apparatus with the Hall board.

As can be seen in FIGS. 4 and 5, the ring-shaped Hall board 5 has two clearances 16 situated opposite one another. The two fixing elements 14 are routed through the two recesses 16 such that the Hall board 5 is releasably connected to the lower ring element 8b. As a result of the positioning apparatus 7 consisting of an elastic material, the two fixing elements 14 can be elastically deformed in order to be introduced into the clearances 16. The four orientation elements 15 protrude into correspondingly shaped further clearances 116 in the Hall board 5, see FIG. 10.

As shown in FIG. 2, the positioning apparatus 7, on the inner lateral surface 7c, includes a fixing device 17 for receiving and holding a bearing 18 for the first end 4a of the rotor shaft 4. In the present exemplary embodiment, the bearing 18 is configured as a ball bearing. The fixing device 17 includes six projections 17a and six positioning surfaces 17b. Here, each support element 9 contains in each case one projection 17a and one positioning surface 17b. The projection 17a can also be referred to as a protrusion. Each of the lugs 17a includes a supporting surface. The positioning surface 17b is positioned in direction B and above each projection 17a on the inner lateral surface 7c.

Figure 6:
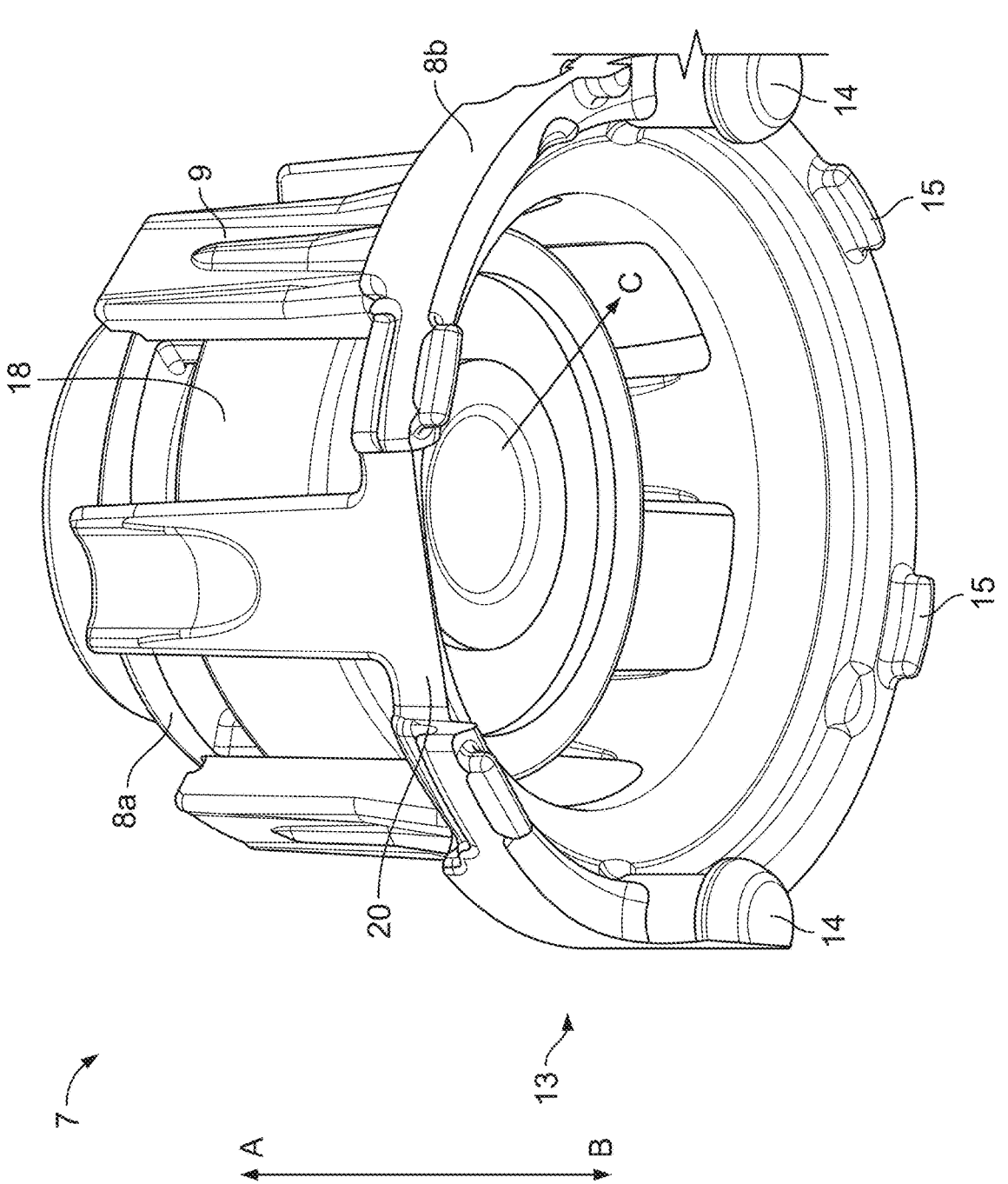
FIG. 6 shows a perspective view of the positioning apparatus, which view shows the bottom side of the positioning apparatus with a bearing.
Figure 7:
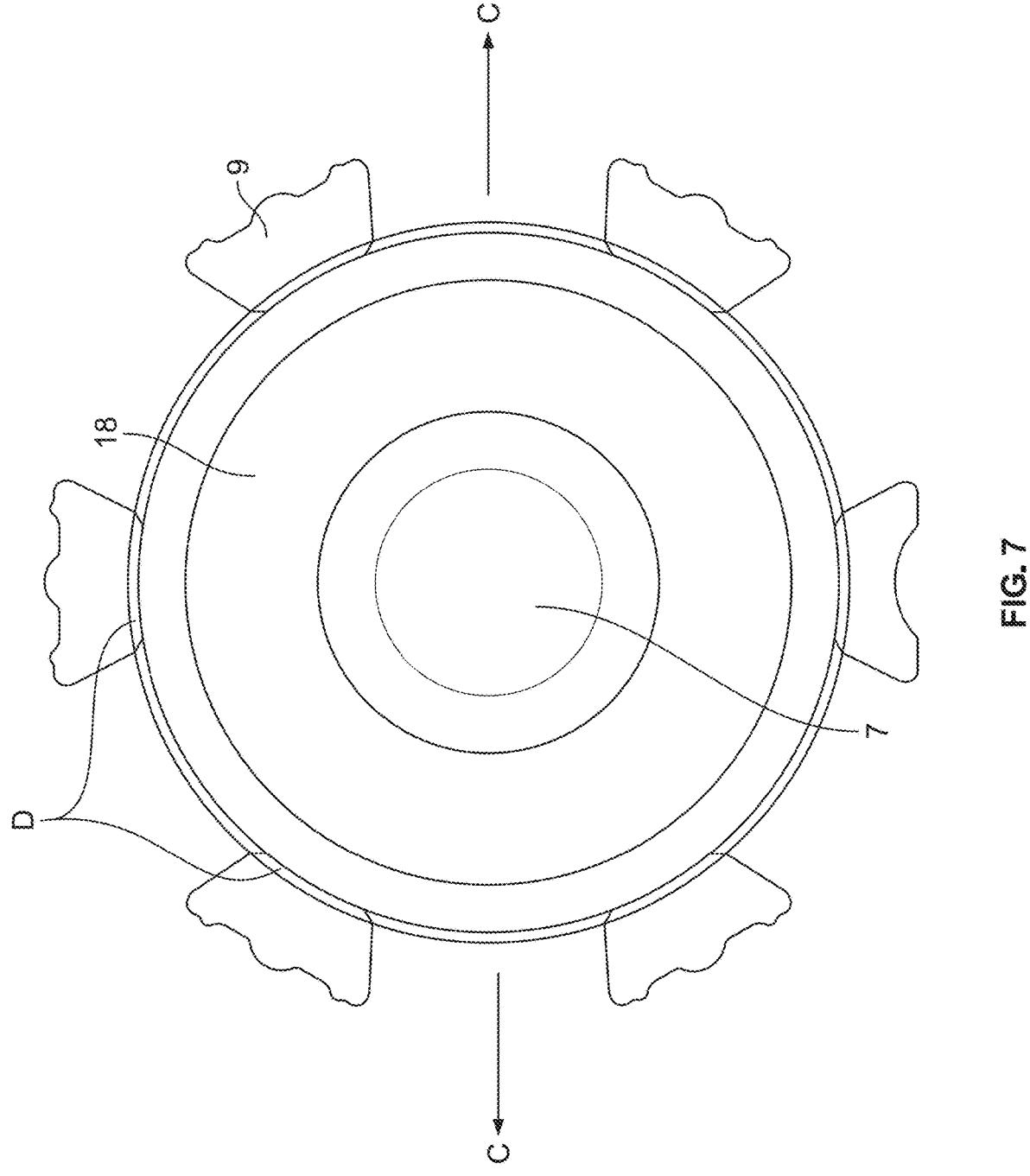
FIG. 7 shows a view of the positioning apparatus with the bearing from below.
Figure 8:
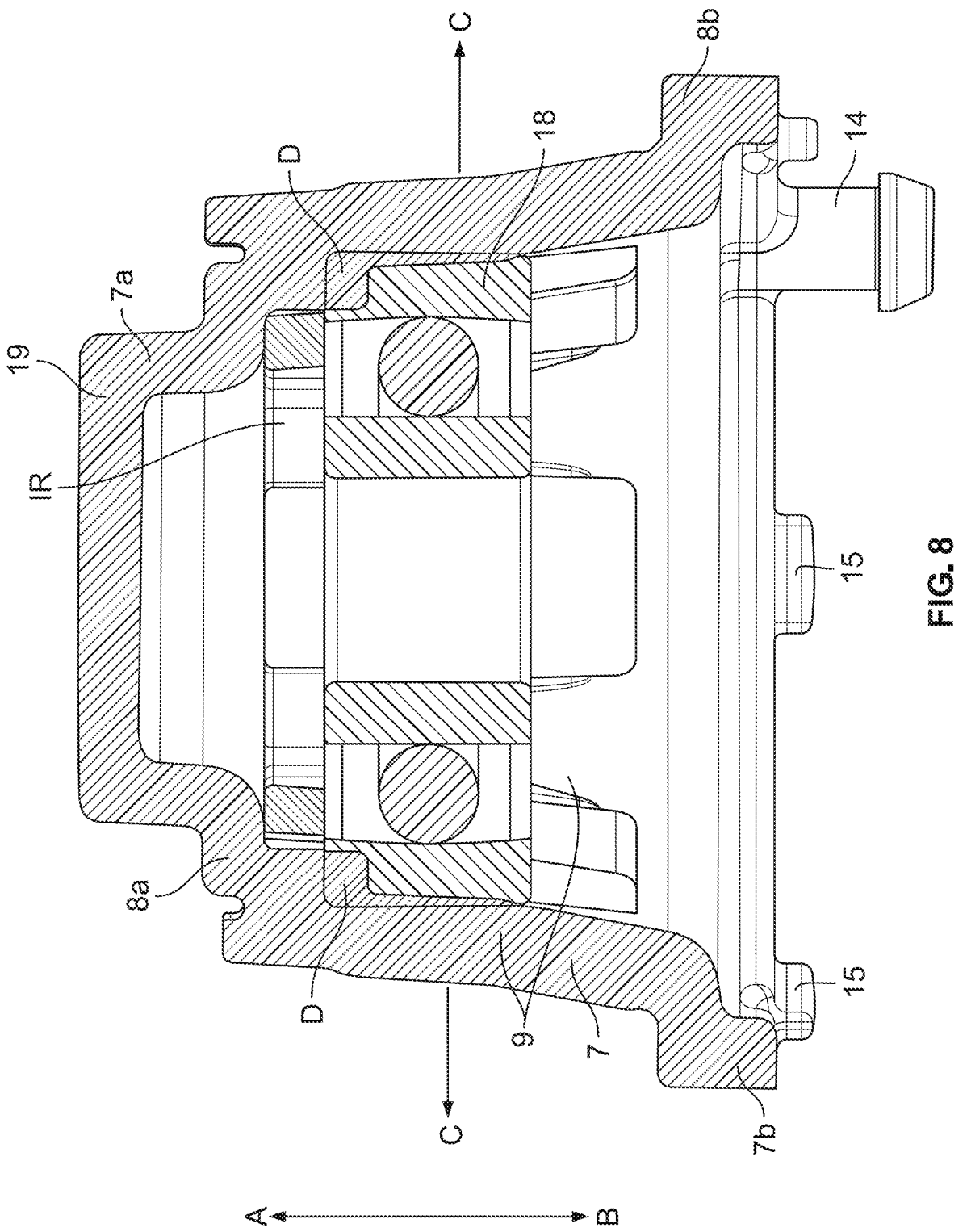
FIG. 8 shows a cross section through the positioning apparatus with the bearing.

When the bearing 18 is positioned in the interior IR of the positioning apparatus 7, the bearing 18 rests on each of the projections 17a in direction A and bears against each of the positioning surfaces 17b, see FIGS. 6 and 8. Since the positioning apparatus 7 is configured in an elastic manner, the support elements 9 deform somewhat elastically in a radial direction C when the bearing 18 is inserted into the interior IR of the positioning apparatus 7. As indicated in FIG. 8, the bearing 18 displaces a region D on the inner lateral surface 7c of the positioning apparatus 7. In other words: in the region D, the material of the positioning apparatus 7 is elastically deformed or squeezed. Owing to the elastic deformation of the support elements 9, the bearing 18 is positioned relatively firmly or immovably in the positioning apparatus 7.

A circular dust protection cap 19 is included at the first end 7a of the positioning apparatus 7. The dust protection cap 19 closes the central opening of the upper ring element 8a and thereby protects the interior IR of the positioning apparatus 7 in direction B from ingressing dust and other contamination.

As already mentioned above, one of the six support elements 9, on the outer lateral wall, has an axially running clearance 10 for receiving and holding the line 11. As can be seen in FIG. 3, the lower ring element 8b includes a clearance 20. The clearance 20 on the lower ring element 8b is positioned below the clearance 10 on the support element 9 in direction B. The clearance 20 on the lower ring element 8*b* serves to receive a plug 21 at the end of the line 11 which connects the Hall board 5 to the control device, see FIG. 4.

FIG. 1 shows a subregion of the electric motor in an assembled state. The rotor shaft 4 is connected to the rotor 3 in a rotationally fixed manner. The rotor 3 and the rotor shaft 4 are positioned within the stator 2 in a rotatable manner. The bearing 18 is located, as described above, in the interior IR of the positioning apparatus 7, see FIG. 8. The positioning apparatus 7 is positioned in the bearing block 18 such that the first end of the rotor shaft 4 protrudes into the interior IR of the positioning apparatus 7 and the first end 4*a* of the rotor shaft 4 is supported in the bearing 18, see FIG. 1. The dust protection cap 19 at the first end 7*a* of the positioning apparatus 7 protrudes in direction A somewhat beyond the bearing block 6, see FIG. 14.

Figure 9:
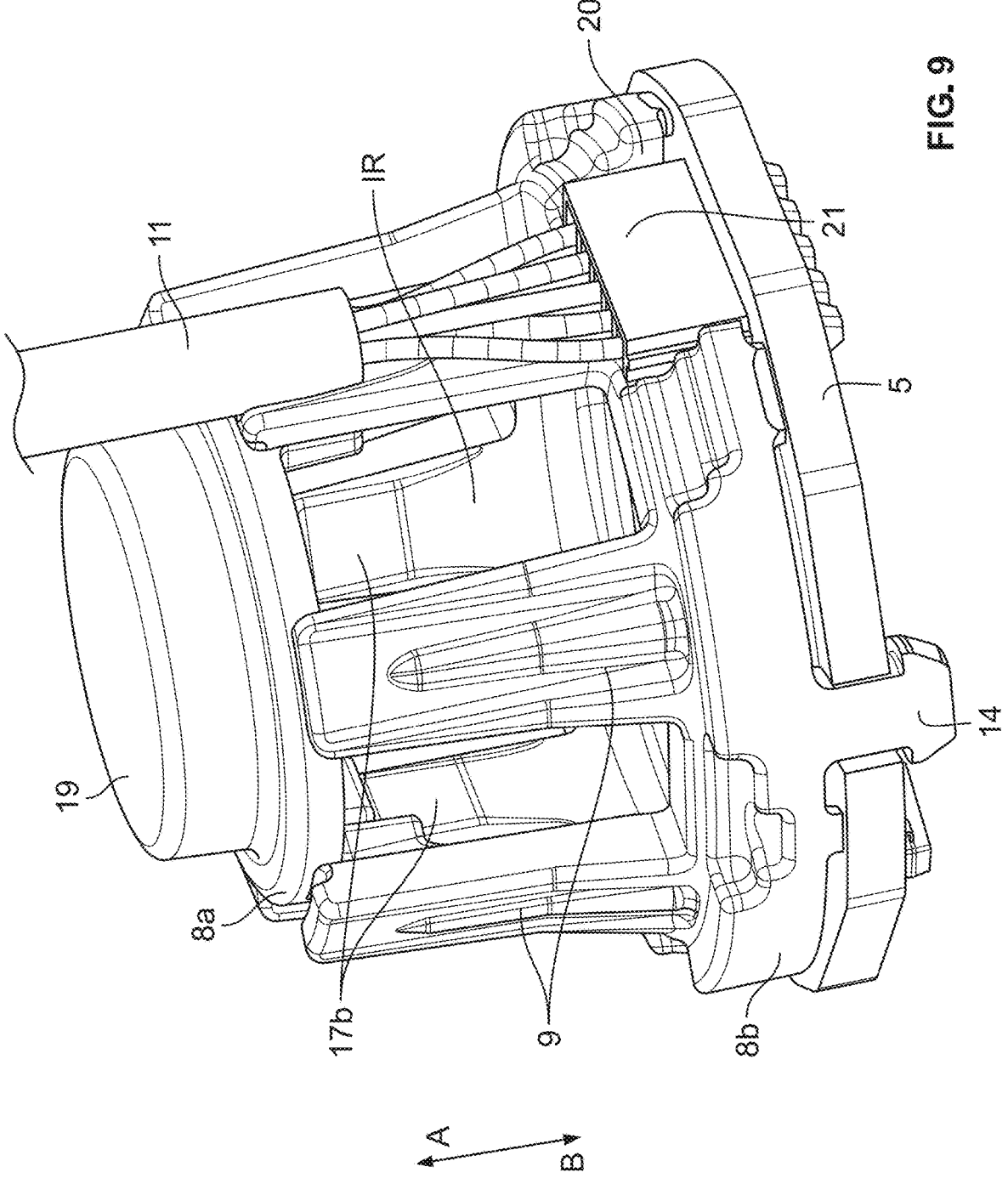
FIG. 9 shows a perspective view of the positioning apparatus with the Hall board and a line.

The line 11 is connected to the plug 21 at one end. As shown in FIG. 9, the plug 21 is plugged into the Hall board 5. The plug 21 is therefore located within the clearance of the lower ring element 8*b*. The line 11 extends from the plug 21 in direction A, so that the line 11 in the clearance 10, formed as a groove, on the support element 9. Since the line 11 is located in the axially running recess 10, the outer diameter of the positioning apparatus 7 is not increased by the line bearing against the outer lateral surface.

Figure 14:
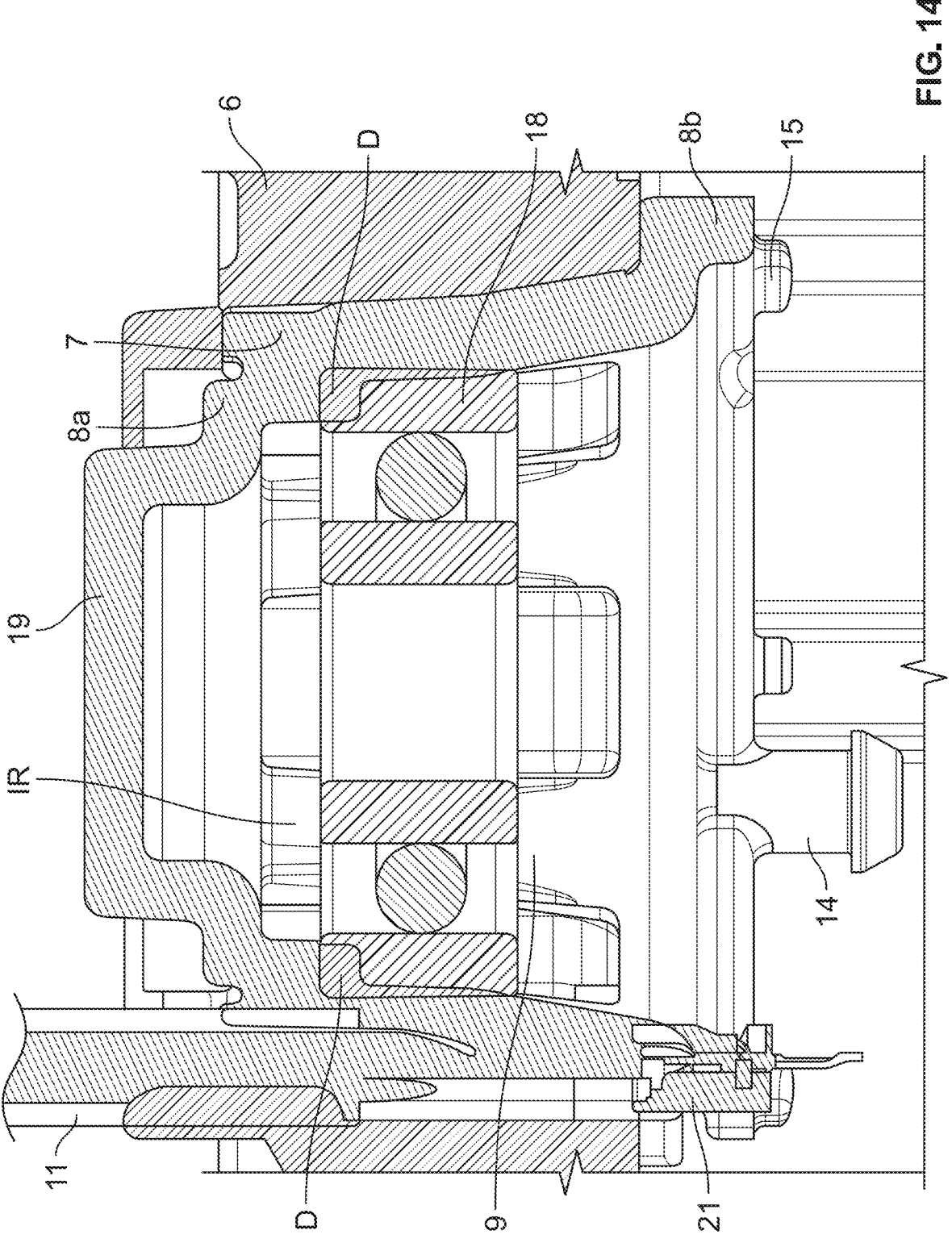
FIG. 14 shows a cross section through the positioning apparatus in the central recess of the bearing block together with the line.

When the positioning apparatus 7, together with the line 11, is positioned in the bearing block 6, the line 11 fits between the bearing block 6 and the positioning apparatus 7, see FIG. 14. The line 11 is therefore clamped in between the bearing block 6 and the positioning apparatus 7 in a relatively stable or fixed manner, as a result of which it is possible to prevent the line 11 from moving unintentionally or even becoming detached from the Hall board 5.

Figure 11:
FIG. 11 shows a perspective view of a top side of the positioning apparatus in a central recess of the bearing block.
Figure 12:
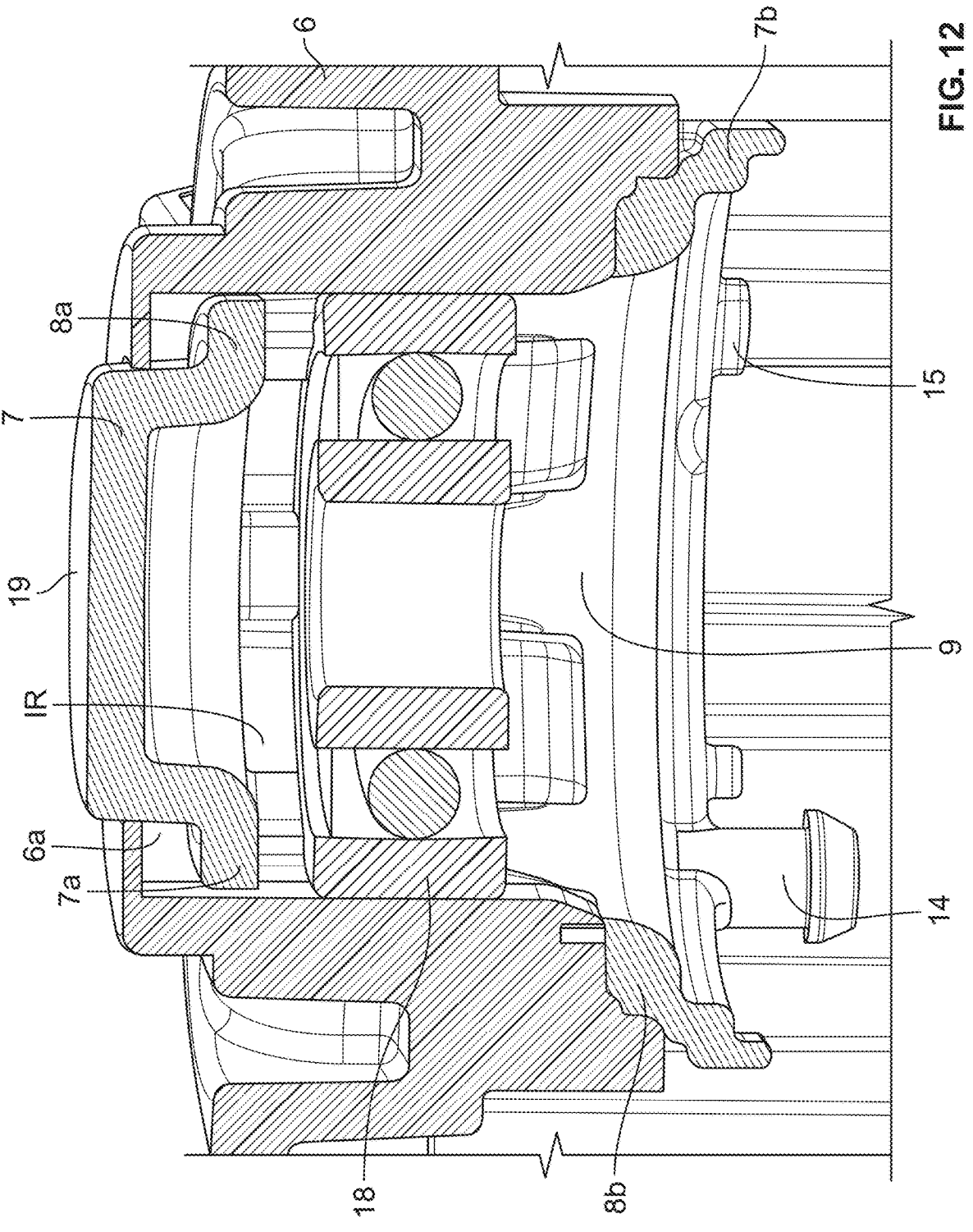
FIG. 12 shows a cross section through the positioning apparatus in the central recess of the bearing block.
Figure 13:
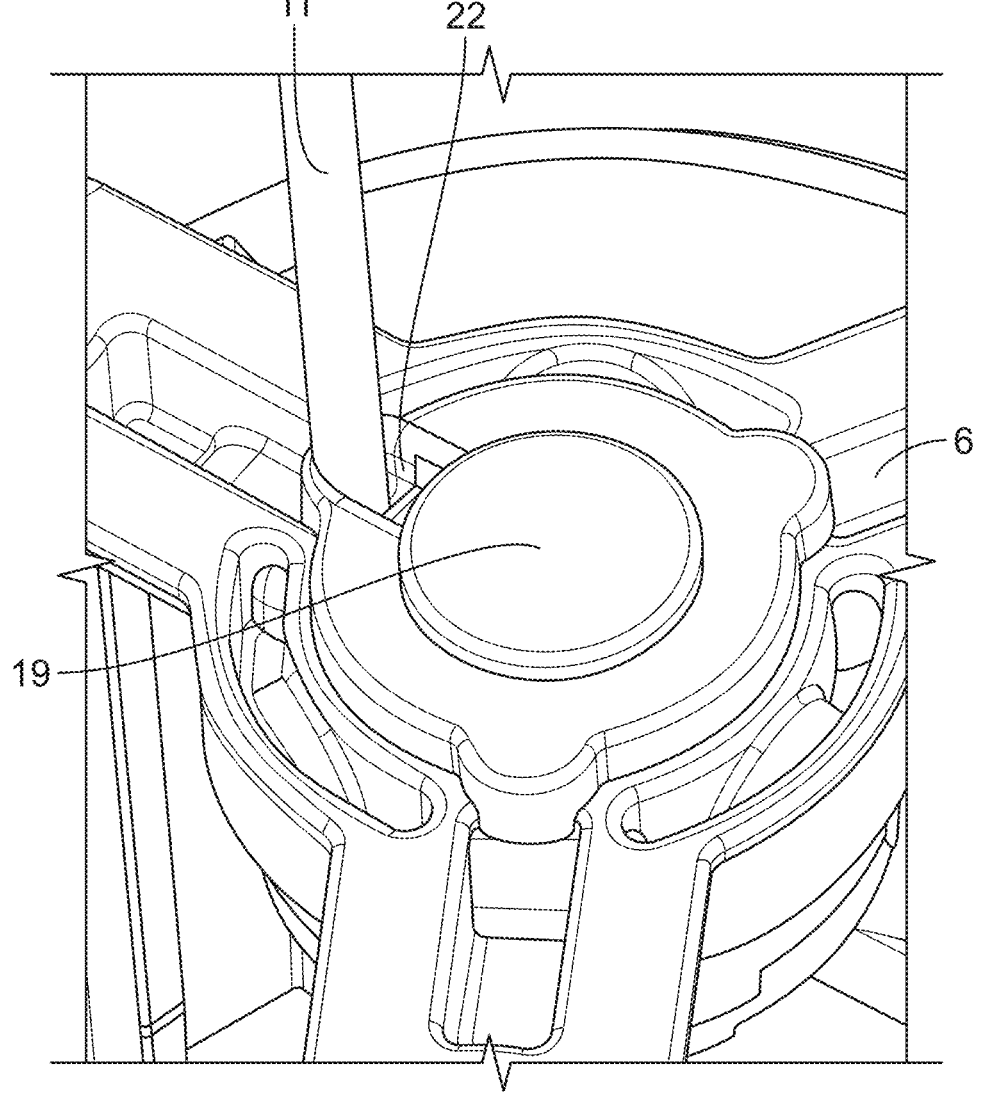
FIG. 13 shows a view of a detail of the positioning apparatus in the central recess of the bearing block with the line which runs through an opening in the bearing block.

Furthermore, the bearing block 6 includes an additional opening 22 on the top side, see FIG. 11 and FIG. 13. The opening 22 serves to allow the line 11 to be routed out of the bearing block 6 by the positioning apparatus 7 located in the bearing block 6. Here, the diameter of the opening 22 corresponds to the diameter of the line 11, so that the line 11 can close the opening 22 against ingressing dust. In addition, the line 11 is held or supported by the opening 22 in the bearing block 6 and/or the stator 2.

According to an alternative exemplary embodiment, the positioning apparatus 7 can be produced partially from elastic material. For example, it may be possible for only the support elements 9 or the upper and/or lower ring elements 8*a*, 8*b* to consist of the elastic material.

LIST OF REFERENCE SIGNS

1 Electric motor
2 Stator
3 Rotor
4 Rotor shaft
5 Hall board
6 Bearing block
7 Positioning apparatus
7*a* First end of the positioning apparatus
7*b* Second end of the positioning apparatus
7*c* Inner lateral surface of the positioning apparatus
7*d* Outer lateral surface of the positioning apparatus
8*a* Upper ring element
8*b* Lower ring element
9 Support element
10 Clearance on the outer lateral surface
11 Line

12 Hall sensor
13 Holding device
14 Fixing element
15 Orientation elements
16 Clearance on the Hall board
17 Fixing device
17*a* Projection on the fixing device
17*b* Positioning surface on the fixing device
18 Bearing
19 Dust protection cap
20 Clearance on the lower ring element
21 Plug
22 Opening on the bearing block
D Region in which the material of the positioning apparatus is elastically deformed
IR Interior of the positioning apparatus

What is claimed is:

1. A positioning apparatus for an electric motor and bearing block, the electric motor including a rotor, a rotor shaft and a stator, the positioning apparatus comprising:
   a pot including at least partially an elastic material and having an interior, the pot positionable in a central recess of the bearing block for at least partially receiving a first end of the rotor shaft; and
   a dust protection cap at a first end of the positioning apparatus;
   wherein the pot includes at least one fixing device for receiving and holding a bearing for the first end of the rotor shaft;
   wherein the fixing device includes a plurality of projections and positioning surfaces, the bearing positionable to rest on each of the projections.

2. The positioning apparatus as recited in claim 1 wherein the pot includes at least one holding device for receiving and holding a Hall board.

3. The positioning apparatus as recited in claim 1 wherein the pot has an outer lateral surface, an axially running clearance is included on being outer lateral surface for at least partially receiving and holding a line when the positioning apparatus is in the central recess of the bearing block.

4. The positioning apparatus as recited in claim 1 wherein the pot has a first end, a second end, an inner lateral surface, an outer lateral surface, an upper ring element, a lower ring element and a plurality of support elements connecting the upper ring element to the lower ring element.

5. The positioning apparatus as recited in claim 4 wherein the plurality of support elements includes six support elements arranged at regular intervals in a circle.

6. The positioning apparatus as recited in claim 5 wherein one of the six support elements includes on the outer lateral surface an axially running clearance for receiving and holding a line.

7. The positioning apparatus as recited in claim 6 wherein the lower ring element includes a holding device for receiving and holding a Hall board connected to the line.

8. The positioning apparatus as recited in claim 4 wherein the lower ring element has a larger diameter than the upper ring element.

9. The positioning apparatus as recited in claim 4 wherein the dust protection cap closes a central opening of the upper ring element.

10. The positioning apparatus as recited in claim 1 wherein the elastic material is rubber.

11. The positioning apparatus as recited in claim 1 wherein the dust protection cap at the first end of the positioning apparatus protrudes in a direction of the first end beyond the bearing block.

12. An electric motor comprising:

a rotor;

a rotor shaft; and a stator, the electric motor connectable to a bearing block by a pot including at least partially an elastic material and having an interior, the pot positionable in a central recess of the bearing block for at least partially receiving a first end of the rotor shaft, a dust protection cap positioned at an end of the pot opposite the rotor shaft;

wherein the pot includes at least one fixing device for receiving and holding a bearing for the first end of the rotor shaft;

wherein the fixing device includes a plurality of projections and positioning surfaces, the bearing positionable to rest on each of the projections.

13. A positioning apparatus for an electric motor and bearing block, the electric motor including a rotor, a rotor shaft and a stator, the positioning apparatus comprising:

a pot including at least partially an elastic material and having an interior, the pot positionable in a central recess of the bearing block for at least partially receiving a first end of the rotor shaft; and a dust protection cap at a first end of the positioning apparatus;

the pot having a first end, a second end, an inner lateral surface, an outer lateral surface, an upper ring element, a lower ring element and a plurality of support elements connecting the upper ring element to the lower ring element;

the plurality of support elements including six support elements arranged at regular intervals in a circle.

14. The positioning apparatus as recited in claim 13 wherein the pot includes at least one holding device for receiving and holding a Hall board.

15. The positioning apparatus as recited in claim 13 wherein the pot has an outer lateral surface, an axially running clearance is included on being outer lateral surface for at least partially receiving and holding a line when the positioning apparatus is in the central recess of the bearing block.

16. The positioning apparatus as recited in claim 13 wherein the elastic material is rubber.

17. The positioning apparatus as recited in claim 13 wherein the lower ring element has a larger diameter than the upper ring element.

18. The positioning apparatus as recited in claim 13 wherein one of the six support elements includes on the outer lateral surface an axially running clearance for receiving and holding a line.

19. The positioning apparatus as recited in claim 18 wherein the lower ring element includes a holding device for receiving and holding a Hall board connected to the line.

20. The positioning apparatus as recited in claim 13 wherein the dust protection cap closes a central opening of the upper ring element.

21. The positioning apparatus as recited in claim 13 wherein the dust protection cap at the first end of the positioning apparatus protrudes in a direction of the first end beyond the bearing block.

* * * * *